United States Patent
Maruyama et al.

(10) Patent No.: US 8,649,742 B2
(45) Date of Patent: Feb. 11, 2014

(54) RADIO COMMUNICATION SYSTEM

(75) Inventors: Tamami Maruyama, Yokohama (JP);
Shinji Uebayashi, Yokohama (JP);
Tatsuo Furuno, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 485 days.

(21) Appl. No.: 12/745,402

(22) PCT Filed: Nov. 28, 2008

(86) PCT No.: PCT/JP2008/071722
§ 371 (c)(1),
(2), (4) Date: Oct. 22, 2010

(87) PCT Pub. No.: WO2009/069780
PCT Pub. Date: Jun. 4, 2009

(65) Prior Publication Data
US 2011/0045764 A1    Feb. 24, 2011

(30) Foreign Application Priority Data

Nov. 30, 2007  (JP) .................. 2007-311649
Sep. 1, 2008   (JP) .................. 2008-224182

(51) Int. Cl.
*H03C 1/52*    (2006.01)

(52) U.S. Cl.
USPC ............ 455/106; 455/25; 343/755; 343/761; 343/775; 343/779

(58) Field of Classification Search
USPC ............ 455/25, 106; 343/738, 755, 761, 775, 343/779, 781 R, 781 P, 815–819, 832–840, 343/878, 912; 342/5, 416
See application file for complete search history.

(56) References Cited

U.S. PATENT DOCUMENTS

| | | | |
|---|---|---|---|
| 5,472,828 | A | 12/1995 | Akins et al. |
| 5,977,926 | A | 11/1999 | Gilger |
| 7,538,946 | B2 | 5/2009 | Smith et al. |
| 7,864,114 | B2 | 1/2011 | Sanada |
| 2004/0066251 | A1 | 4/2004 | Eleftheriades et al. |

(Continued)

FOREIGN PATENT DOCUMENTS

| | | |
|---|---|---|
| EP | 0 575 850 A2 | 12/1993 |
| JP | 6-226477 A | 8/1994 |

(Continued)

OTHER PUBLICATIONS

Stefan Enoch, et al., "The Richness of the Dispersion Relation of Electromagnetic Bandgap Materials", IEEE Transactions on Antennas and Propagation, vol. 51, No. 10, Oct. 2003, pp. 2659-2666.

(Continued)

*Primary Examiner* — Dominic E Rego
(74) *Attorney, Agent, or Firm* — Oblon, Spivak, McClelland, Maier & Neustadt, L.L.P.

(57) ABSTRACT

A radio communication system according to the present invention includes a scatterer configured to reflect, refract, or transmit a radio wave radiated primarily from a transmission side apparatus to radiate the radio wave secondarily to a desired area and a metamaterial is used for the scatterer.

14 Claims, 9 Drawing Sheets

(56) References Cited

U.S. PATENT DOCUMENTS

| | | | |
|---|---|---|---|
| 2004/0140945 A1 | 7/2004 | Werner et al. | |
| 2005/0107125 A1* | 5/2005 | Gilbert | 455/562.1 |
| 2005/0168391 A1* | 8/2005 | Ratajczak et al. | 343/773 |
| 2005/0200540 A1 | 9/2005 | Isaacs et al. | |
| 2006/0028385 A1 | 2/2006 | Davis et al. | |
| 2006/0178114 A1* | 8/2006 | Fischer | 455/87 |
| 2007/0079012 A1* | 4/2007 | Walker | 709/249 |
| 2007/0237478 A1* | 10/2007 | D'Aguanno et al. | 385/129 |
| 2008/0043475 A1* | 2/2008 | Bernkopf | 362/326 |
| 2008/0197369 A1* | 8/2008 | Batres et al. | 257/98 |
| 2008/0218887 A1* | 9/2008 | Deutsch et al. | 359/838 |
| 2010/0127823 A1* | 5/2010 | DeJean et al. | 340/5.8 |

FOREIGN PATENT DOCUMENTS

| | | |
|---|---|---|
| JP | 6-260739 A | 9/1994 |
| JP | 8-288901 | 11/1996 |
| JP | 10-75110 | 3/1998 |
| JP | 2000-101340 A | 4/2000 |
| JP | 2004-297763 | 10/2004 |
| JP | 2005-210016 | 8/2005 |
| JP | 2005-244884 A | 9/2005 |
| JP | 2005-260965 | 9/2005 |
| JP | 2006-245926 A | 9/2006 |
| JP | 2006-253929 | 9/2006 |
| KR | 10-2007-0050051 | 5/2007 |
| WO | WO 2006/015478 A1 | 2/2006 |
| WO | WO 2006/023195 A2 | 3/2006 |
| WO | WO 2006/039699 A2 | 4/2006 |
| WO | WO 2006/093302 A1 | 9/2006 |

OTHER PUBLICATIONS

Office Action issued on Sep. 16, 2011 in the counterpart Korean Patent Application No: 10-2010-7012194 (with English Translation).
Kihun Chang, et al., "High-impedance Surface with Nonidentical Lattices", Porceedings of iWAT2008, IEEE, 2008, pp. 474-477.
Yoichi Asano, et al., "A Two-Arm Strip Spiral Antenna Printed on a Dielectric Substrate Backed by a Finite-Sized EBG Reflector", Society Conference of Institute of Electronics, Information and Communication Engineers, 2-B-1-62, 2006, 2 pages (With English Abstract).
Nikkei Electronics, "Left-handed metamaterial: Achieving various epoch-making components Overcoming a hurdle in reducing an insertion loss", No. 916, Jan. 2, 2006, 11 pages (With English Abstract).
Hiroyuki Uno, et al., "Radiation Property of Tilted Beam Slot Antenna Over Electromagnetic Band-Gap Reflector", Society Conference of Institute of Electronics, Information and Communication Engineers, Society B-1-56, 2006, 2 pages (With English Abstract).
Takeshi Miyoshi, et al., "Reflectarray using mushroom structure with variable via position", IEICE Technical Report AP Nov. 2007, Apr. 2007, pp. 59-63.
Japanese Office Action Issued May 22, 2012 in Patent Application No. 2008-224182 (with English translation).
Chinese Office Action issued Aug. 31, 2012 in Patent Application No. 200880118538.5 with English Translation.
The Extended European Search Report issued Feb. 1, 2012, in Europe Application No. / Patent No. 08853253.6.
Japanese Office Action issued Feb. 28, 2012, in Japan Patent Application No. 2008-224182 (with English translation).
Chinese Office Action issued May 21, 2013 in Chinese Patent Application No. 200880118538.5 with English translation, 12 pages.

* cited by examiner

FIG. 7

| $\varepsilon_y$ | $\mu_x$ | $\mu_z$ | ANGLE | IMAGE |
|---|---|---|---|---|
| −0.8 | −1.9 | −1.9 | TRANSMISSION ANGLE = −45° | 45° ↙ 45° ↘z, x↑ |
| −0.6 | 1 | −0.4 | TRANSMISSION ANGLE = −60° | 45° ↙ 60° ↘z, x↑ |
| −0.6 | −0.4 | 1 | REFLECTION ANGLE = 60° & TRANSMISSION ANGLE = 30° | 45° ↙ 60° ↗ 30°↘ z, x↑ |

RADIO COMMUNICATION SYSTEM

TECHNICAL FIELD

The present invention relates to a radio communication system including a scatterer which is configured to reflect, refract, or transmit a radio wave radiated primarily from a transmission side apparatus and to thereby radiate the radio wave secondarily to a desired area.

BACKGROUND ART

As shown in FIG. 1, a method using a reflector 2 in a radio communication system is proposed in order to improve communication quality between a radio base station BS and a mobile station UE. The reflector 2 is configured to reflect a radio wave radiated primarily from the radio base station BS (a transmission side apparatus) so that the radio wave is reflected secondarily.

To be more specific, as shown in FIG. 1, the radio wave radiated primarily from the radio base station BS is blocked by an obstacle 4 such as a building. Therefore, the mobile station UE located in a shadow region 3 is unable to ensure a line-of-sight path from the radio base station BS, and thus is unable to ensure a desired communication quality.

To address this, in the radio communication system disclosed in Patent Document 1 described above, the reflector 2 is installed in a position that allows the mobile station UE to ensure a line-of-sight path from the radio base station BS, and the reflector 2 radiates the radio wave reflected off the reflector 2, to the shadow region 3 from behind the obstacle 4. Accordingly, the radio communication system disclosed in the above-described Patent Document 1 can improve the communication quality in the shadow region 3.

In general, a direction in which the radio wave radiated primarily from the radio base station BS and then made incident on the reflector 2 can travel is determined in accordance with a place where the reflector 2 is installed and an angle at which the reflector 2 is installed.

To be more specific, as shown in FIG. 2, the radio wave (an incident wave) made incident on the reflector 2 through a medium 1 (air) having a refractive index n1 is reflected off a surface of the reflector 2 and then travels in a direction at a reflection angle of specular reflection of the radio wave.

Here, the incident angle of the radio wave is defined as "$\theta i1$" and the reflection angle of the radio wave is defined as "$\theta r1$". In this case, if the radio wave is made incident as a plane wave, it is known that (Formula 1) holds true by solving a boundary condition with the surface of the reflector defined as a boundary surface.

$$\theta i1 = \theta r1 \quad \text{(Formula 1)}$$

Specifically, the radio wave (a reflected wave) reflected off the surface (the boundary surface) of the reflector 2 travels in a direction at the angle $\theta r1$ (a direction of specular reflection) which is the same as the incident angle $\theta i1$ of the radio wave (the incident wave).

That is to say, the above-described radio communication system employs the reflector 2 which is configured to reflect the radio wave radiated primarily from the radio base station BS (the transmission side apparatus) so that the radio wave is radiated secondarily to a desired area.

The above-described radio communication system, however, involves the following problem. Specifically, the radio wave which is radiated primarily from the radio base station BS and then made incident on the reflector 2 can only travel in the direction at the above-mentioned reflection angle of the specular reflection. Hence, in an environment where the angle at which the reflector 2 is installed is not sufficiently adjustable, the radio wave may be unable to be radiated secondarily to the desired area (the shadow region 3).

The present invention has been made in view of the foregoing problem and an object of the present invention is to provide a radio communication system which employs a scatterer configured so that a radio wave radiated primarily from a transmission side apparatus is radiated secondarily by the scatterer in directions other than a direction at a reflection angle of specular reflection.

DISCLOSURE OF INVENTION

The first feature of the present invention is a radio communication system comprising a scatterer configured to reflect, refract, or transmit a radio wave radiated primarily from a transmission side apparatus to radiate the radio wave secondarily to a desired area and a metamaterial is used for the scatterer.

In The first feature of the present invention, the scatterer may have a structure which allows the radio wave to be radiated secondarily in a direction at an angle different from a reflection angle of specular reflection.

In The first feature of the present invention, the scatterer may have a structure which allows only radio waves in one or a plurality of predetermined frequency bands to be radiated secondarily.

In The first feature of the present invention, the scatterer may have a structure which allows the radio waves made incident to be concentrated in a direction of propagation.

In The first feature of the present invention, the scatterer may be formed of an EBG structure.

In The first feature of the present invention, the transmission side apparatus may be any of a radio base station and a mobile station.

In The first feature of the present invention, the EBG structure may be formed of a periodic structure in which the radio wave made incident on the scatterer is converted into a Bloch wave.

In The first feature of the present invention, a metal reflector may be disposed on a back surface of the metamaterial.

In The first feature of the present invention, the system may be configured so that a radio wave having passed through the metamaterial reaches the metal reflector, and the radio wave having reflected off the metal reflector is radiated secondarily without passing through the metamaterial.

In The first feature of the present invention, the system may be configured so that a radio wave having reached the metal reflector without passing through the metamaterial is reflected off the metal reflector, and thereafter passes through the metamaterial to be reflected secondarily.

In The first feature of the present invention, the metamaterial may be configured to operate in a first frequency band and a second frequency band, and the metamaterial may be configured to radiate, secondarily to the mobile station, a radio wave having been radiated primarily from the radio base station in the first frequency band and to radiate, secondarily to the base station, a radio wave having been radiated primarily from the mobile station in the second frequency band.

In The first feature of the present invention, the metamaterial may be formed into a shape of a polyhedron, the system being configured so that a radio wave made incident on the metamaterial at a first incident angle is refracted in a direction at a second refraction angle by a first boundary surface, and is also configured so that the system being configured so that a second boundary surface through which the refracted radio wave is radiated from an inside of the metamaterial to air is formed non-parallel to the first incident angle In The first feature of the present invention, the metamaterial may have a structure in which an evanescent wave is amplified inside the metamaterial by setting an electric constant of at least any one of a permittivity and a magnetic permeability of the metamaterial to a negative value and setting a propagation constant of the metamaterial to a negative value.

In The first feature of the present invention, the metamaterial may be formed of a periodic structure in which the radio wave made incident on the scatterer is converted into a Bloch wave.

In The first feature of the present invention, the scatterer may be formed of a reflector that controls a phase of a reflected wave of a radio wave radiated primarily from the transmission side apparatus, and a reflection characteristic of the reflector may be set in a way that the radio wave radiated primarily from the transmission side apparatus is reflected as an equiphase plane wave to be directed to a different direction from a reflection angle of specular reflection.

In The first feature of the present invention, the reflector may be formed of a frequency selective reflector, and a reflection characteristic of the reflector may be set in a way that only radio waves in one or a plurality of predetermined frequency bands among radio waves radiated primarily from the transmission side apparatus are reflected as equiphase plane waves to be directed to a different direction from a reflection angle of specular reflection.

BRIEF DESCRIPTION OF THE DRAWINGS

FIG. 7 is a view for explaining the traveling directions of the radio wave via the scatterer used in the radio communication system according to the second embodiment of the present invention.

BEST MODES FOR CARRYING OUT THE INVENTION (Radio Communication System According to First Embodiment of the Present Invention)

A radio communication system according to a first embodiment of the present invention will be described with reference to FIG. 3 to FIG. 5.

Figure 1:
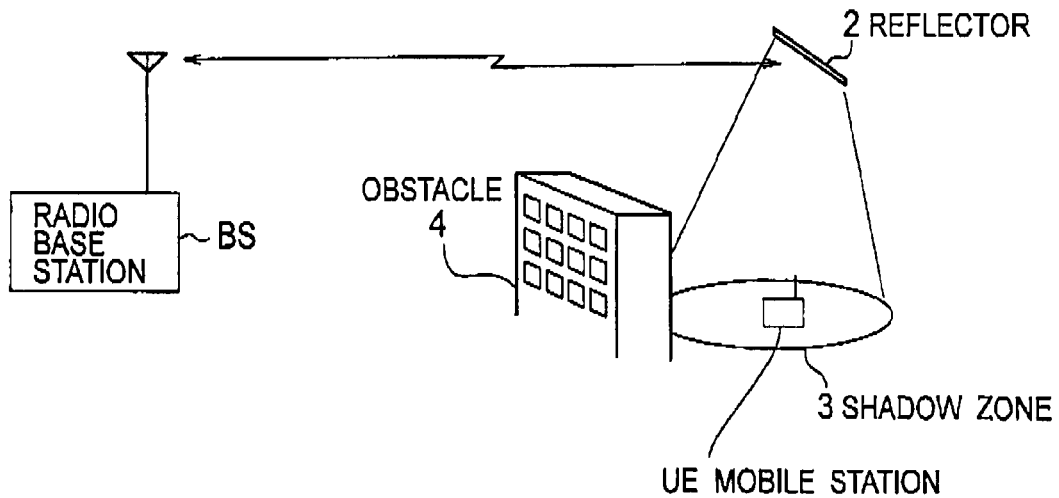
FIG. 1 is an overall configuration diagram of a conventional radio communication system.
Figure 2:
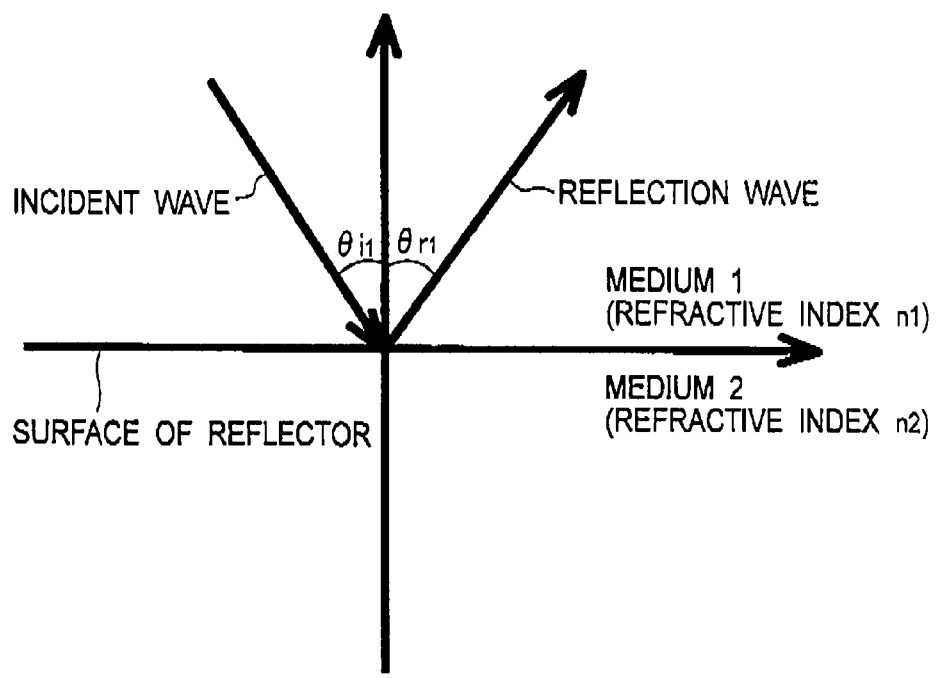
FIG. 2 is a view for explaining a traveling direction of a radio wave via a scatterer used in the conventional radio communication system.
Figure 3:
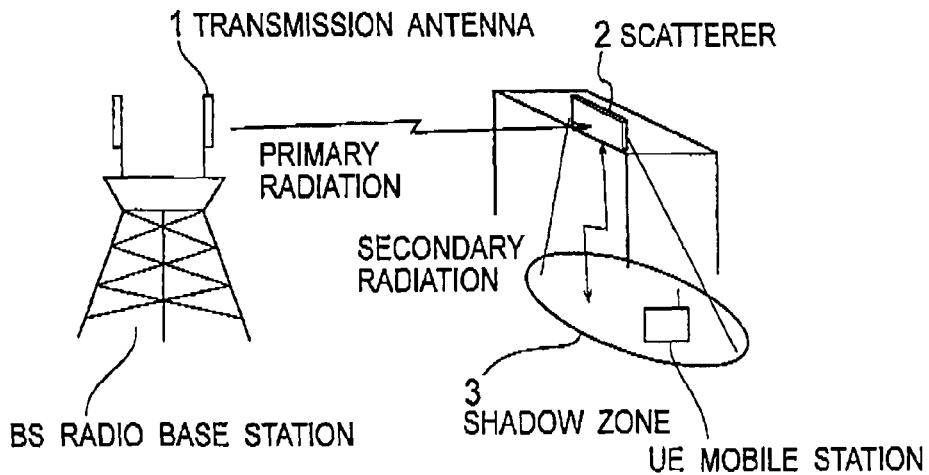
FIG. 3 is an overall configuration diagram of a radio communication system according to a first embodiment of the present invention.

As shown in FIG. 3, the radio communication system according to the present embodiment includes a scatterer 2 configured to reflect, refract, or transmit a radio wave that is radiated primarily from a radio base station BS (transmission side apparatus) so that the radio wave is radiated secondarily to a mobile station (a receiving side apparatus) located in a shadow region 3 (a desired area).

Here, in the present embodiment, the transmission side apparatus may be a mobile station while the receiving side apparatus may be the radio base station BS.

In the present embodiment, a metamaterial is used as the scatterer 2. In the present embodiment, the "metamaterial" is a material which is formed by arranging a predetermined structure, and which artificially determines surface impedance or any of an equivalent permittivity and an equivalent magnetic permeability of the entire structure.

For example, the metamaterial may be any of the following.

(1) A material having a negative refractive index (a left-handed material)

(2) A material having a permittivity and a magnetic permeability which are both negative (3) A material having a negative permittivity (a magnetic permeability thereof may be either negative or positive)

(4) A material having a negative magnetic permeability (a permittivity thereof may be either negative or positive)

(5) A material in which any of a permittivity or a magnetic permeability is negative (6) A ferromagnet (7) Plasma (8) A structure having an HIS (High Impedance Surface)

(9) An EBG structure based on an FSS frequency selective surface (an FSS-Based EBG Surface)

(10) A band gap structure

(11) A mushroom structure

(12) An artificial crystal structure

(13) An SRR structure (a split-ring resonator structure)

(14) Composite Right/Left-Handed Transmission Line Metamaterials

(15) A structure in which a direction of a pointing vector is reverse to a direction of a group velocity Meanwhile, in the present embodiment, the metamaterial constituting the scatterer 2 may be formed by an EBG (Electromagnetic Band Gap) structure.

Here, the "EBG structure" is an artificial structure capable of freely manipulating and controlling a direction of propagation of an electromagnetic wave, such as a structure in which a band gap structure exists in a frequency band of a radio wave but not of light.

For example, conceivable main functions of the "EBG structure" include a "function to block propagation of an electromagnetic wave", a "function to allow an electromagnetic wave to transmit only in a specific direction", a "function to concentrate an electromagnetic wave in a specific area", and other functions.

Moreover, the scatterer 2 has a structure which allows a radio wave that is made incident (an incident wave) to be secondarily radiated not only in a reflection angle direction A of specular reflection but also in directions other than the reflection angle direction A of specular reflection.

Specifically, the radio communication system according to the present embodiment is configured to use not only the radio wave radiated secondarily in the reflection angle direction A of specular reflection but also the radio wave radiated secondarily in the direction other than the reflection angle direction A of specular reflection, in order to cause the radio wave radiated primarily from the transmission side apparatus to reach the shadow region 3.

Meanwhile, the reflector used in the conventional radio communication system has the structure which allows the radio wave that is made incident (the incident wave) to be secondarily radiated only in the reflection angle direction A of specular reflection.

Specifically, the conventional radio communication system is configured to use only the radio wave that is radiated secondarily in the reflection angle direction A of specular reflection in order to cause the radio wave radiated primarily from the transmission side apparatus to reach the shadow region 3. The conventional radio communication system does not use a transmitted wave which is transmitted through the reflector, a reflected wave which is reflected in directions other than the reflection angle direction A of specular reflection, and other waves, in order to cause the radio wave radiated primarily from the transmission side apparatus to reach the shadow region 3.

Figure 4:
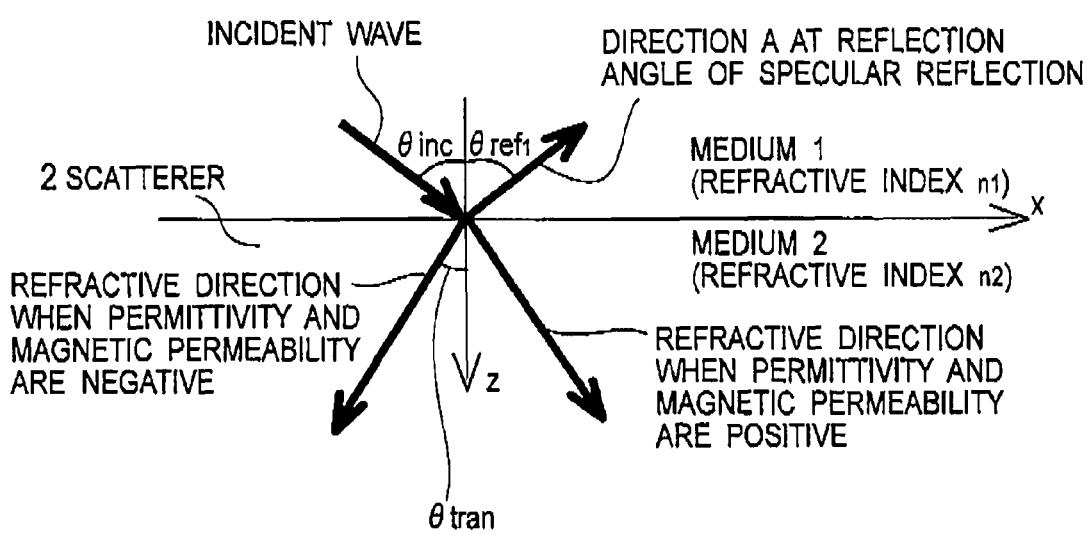
FIG. 4 is a view for explaining traveling directions of a radio wave via a scatterer used in the radio communication system according to the first embodiment of the present invention.

As shown in FIG. 4, in the scatterer 2 according to the present embodiment, a reflection angle $\theta\mathrm{refl}$ of the radio wave is equal to an incident angle $\theta\mathrm{inc}$ of the radio wave.

Meanwhile, a refraction angle $\theta\mathrm{tran}$ of the radio wave in the EBG structure constituting the scatterer 2 according to the present embodiment is determined by the following (Formula 2).

[Expression 1]

$$\theta\mathit{tran} = \mathrm{sgn}(n_2)\sin^{-1}\left(\frac{n_1}{|n_2|}\sin\theta\mathit{inc}\right) \quad \text{(Formula 2)}$$

Here, the Snell's law (Formula 2-1) holds true based on a boundary condition of a boundary surface.

$$n1 \times \sin\theta i1 = n2 \times \sin\theta t2 \quad \text{(Formula 2-1)}$$

Specifically, the refraction angle $\theta\mathrm{tran}$ of the radio wave in the scatterer 2 according to the present embodiment is determined corresponding to a refractive index n1 of a medium 1 (air) and a refractive index n2 of a medium 2 (the EBG structure).

Here, a value of a refractive index n is determined by the following (Formula 3) by use of electric constants, namely, permittivities $\in$ and magnetic permeabilities $\mu$, of the medium 1 and medium 2.

[Expression 2]

$$n = \frac{kc}{\omega} = \sqrt{\frac{\varepsilon}{\varepsilon_0}}\sqrt{\frac{\mu}{\mu_0}} = $$
$$-\left[\left(|\varepsilon_r||\mu_r| - \frac{\varepsilon^*}{\varepsilon_0}\frac{\mu^*}{\mu_0}\right) + j\left(\frac{\varepsilon^*|\mu_r|}{\varepsilon_0} + \frac{\mu^*|\varepsilon_r|}{\mu_0}\right)\right]^{1/2} \approx$$
$$-|\varepsilon_r|^{1/2}|\mu_r|^{1/2}\left[1 + j\frac{1}{2}\left(\frac{\varepsilon^*}{|\varepsilon_r|\varepsilon_0} + \frac{\mu^*}{|\mu_r|\mu_0}\right)\right] \quad \text{(Formula 3)}$$

Meanwhile, if values of a permittivity $\in$ and a magnetic permeability $\mu$ are negative in (Formula 3), the values are expressed by the following (Formula 4) and (Formula 5), respectively.

[Expression 3]

$$\sqrt{\varepsilon} = \sqrt{\varepsilon_r\varepsilon_0 - j\varepsilon^*} \approx -j\left(|\varepsilon_r\varepsilon_0|^{1/2} + j\frac{\varepsilon^*}{2|\varepsilon_r\varepsilon_0|^{1/2}}\right) \quad \text{(Formula 4)}$$

$$\sqrt{\mu} = \sqrt{\mu_r\mu_0 - j\mu^*} \approx -j\left(|\mu_r\mu_0|^{1/2} + j\frac{\mu^*}{2|\mu_r\mu_0|^{1/2}}\right) \quad \text{(Formula 5)}$$

Therefore, the scatterer 2 used in the radio communication system according to the present embodiment is able to refract the radio wave radiated primarily by the radio base station BS by way of the EBG structure and by use of a negative refraction index and to radiate the radio wave secondarily in directions which the conventional reflector can not radiate the radio wave (a refraction direction when the permittivity and the magnetic permeability in FIG. 4 are negative).

Meanwhile, when both of the permittivity and the magnetic permeability are positive, the radio wave radiated primarily by the radio base station BS is radiated secondarily in a refraction direction in a positive case.

Here, it is conceivable in general that a transmitted wave which is once refracted by the medium 2 is refracted again when returning from the medium 2 to the original medium 1, and thus returns to the same line as that of the incident wave. In this description, approaches as described in the following second and third embodiments are invented as methods for preventing this problem.

(Radio Communication System According to Second Embodiment of the Present Invention)

In a radio communication system according to the present embodiment, the scatterer 2 made of the metamaterial and used in the first embodiment is formed into a shape of a polyhedron. The scatterer 2 is configured to refract the radio wave that is made incident on the metamaterial at a first incident angle in a direction at a second refraction angle by way of a first boundary surface, and to radiate the refracted radio wave secondarily at a different angle from the first incident angle by way of a second boundary surface through which the radio wave is emitted from an inside of the metamaterial to the air.

Figure 5:
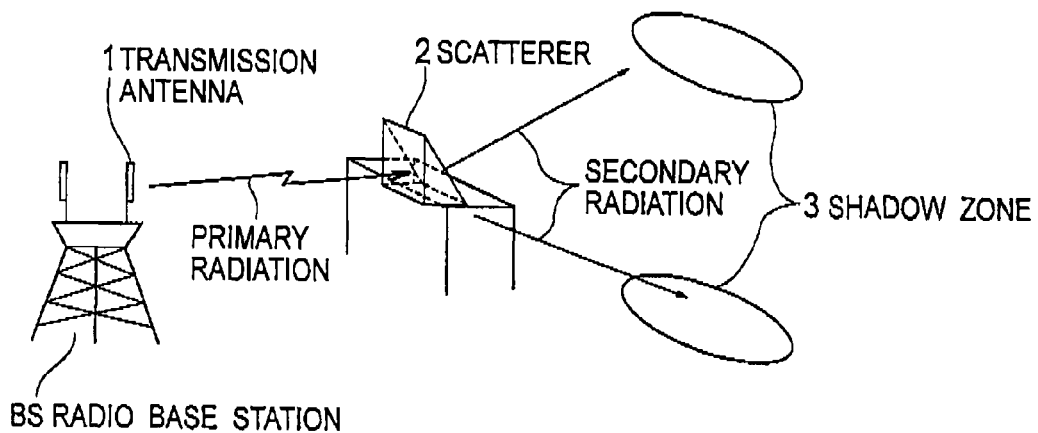
FIG. 5 is an overall configuration diagram of a radio communication system according to a second embodiment of the present invention.
Figure 6:
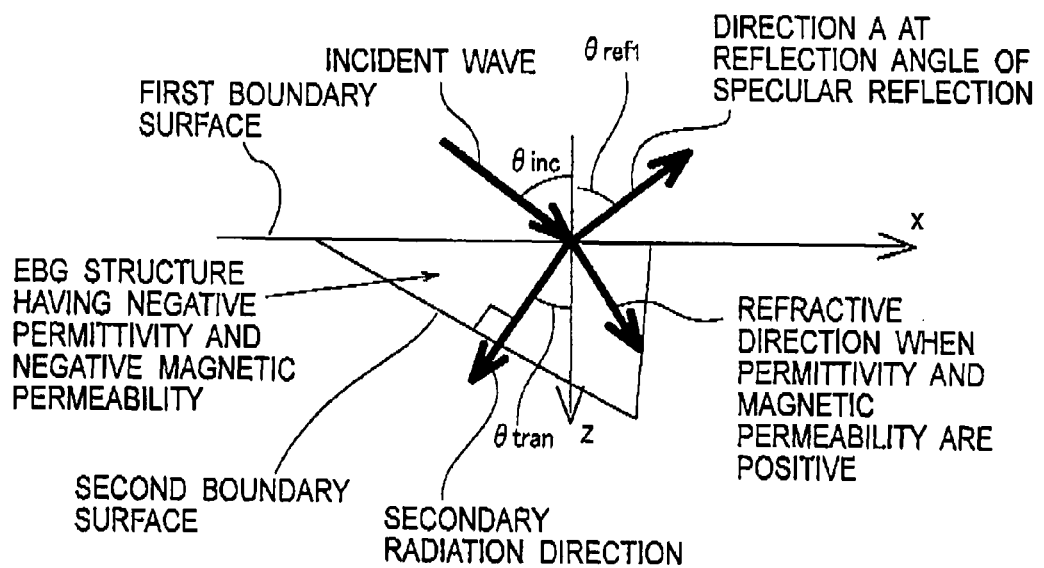
FIG. 6 is a view for explaining traveling directions of a radio wave via a scatterer used in the radio communication system according to the second embodiment of the present invention.

For example, as shown in FIG. 5 and FIG. 6, the scatterer 2 configured in the following manner is able to radiate secondarily the transmitted wave in the same direction at the refraction angle $\theta\mathrm{tran}$ as the transmitted wave has been travelling. Specifically, the scatterer 2 is configured to refract the radio wave, made (the incident wave) made incident at the incident angle θinc, in the direction at the refraction angle θtran at the first boundary surface and to have the second boundary surface between the medium 1 (the air) and the medium 2 (the metamaterial) arranged perpendicularly to the direction at the refraction angle θtran.

Meanwhile, by setting the first boundary surface so as not to be parallel to the second boundary surface in consideration of the refraction at the transmission, the transmission wave can be secondarily radiated in a different line from that of the incident angle of the incident wave.

Here, the technique of forming the scatterer 2, as shown in the present embodiment, is not limited to the case of the scatterer 2 made of the metamaterial, in which the scatterer 2 is formed into a shape of the polyhedron and configured to control the direction of secondary radiation by having the first boundary surface on which the radio wave is made incident not parallel to the second boundary surface through which the radio wave is radiated. It is needless to say that the technique is applicable to any media.

FIG. 7 is a view showing directions of the refraction angles θtran when using the EBG structures having various values of the permittivities $\in$ and the magnetic permeabilities μ (including negative values). FIG. 7 shows aspects of change in the refracting direction of the radio wave depending on the values of the permittivities $\in$ and the magnetic permeabilities μ.

According to the radio communication system of the present embodiment, setting the values of the permittivity $\in$ and the magnetic permeability μ of the EBG structure of the scatterer 2 in accordance with the environment where the scatterer 2 is installed makes it possible to radiate secondarily the radio wave in a desired direction, and thus to causes the radio wave to reach a range to which the conventional reflector fails to radiate the radio wave secondarily.

(Radio Communication System According to Third Embodiment of the Present Invention)

As a radio communication system according to a third embodiment of the present invention, a mode of determining the above-described refraction angle θtran and a mode of concentrating electric field intensity by a super prism effect will be shown, where the refraction angle θtran is determined based on an array according to a periodic structure of any of a capacitor and an inductance in the EBG structure constituting the scatterer 2.

In the radio communication system according to the present embodiment, the scatterer 2 is formed of the EBG structure and has a structure in which radio waves incident on the scatterer 2 having the EBG structure is concentrated in a direction of propagation.

Figure 13:
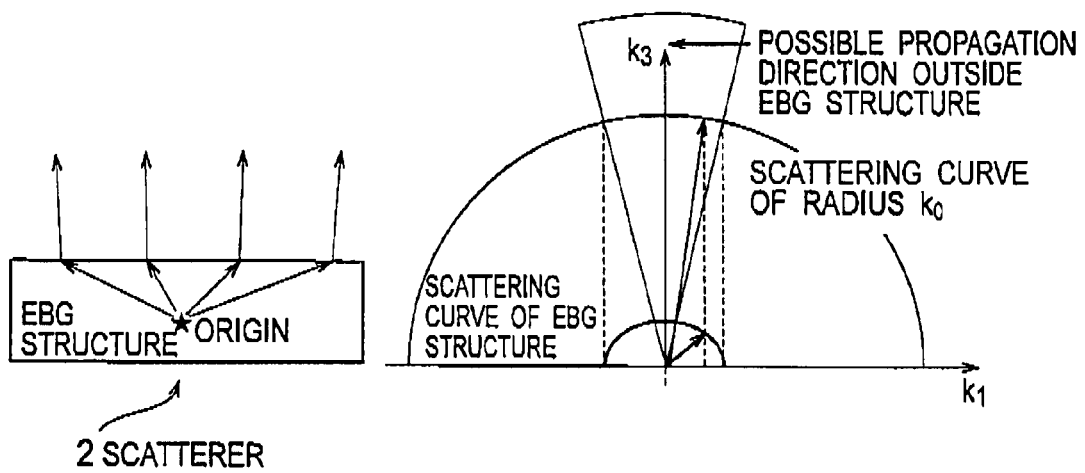
FIG. 13 is a view for explaining a scatterer used in a radio communication system according to a third embodiment of the present invention.

As shown in FIG. 13, the scatterer 2 used in the radio communication system according to the present embodiment is configured to concentrate radio waves which are made incident in a single propagation direction by superposing the radio waves by using the periodic structure inside the EBG structure and configured to radiate the radio waves secondarily.

Specifically, inside the EBG structure, the scatterer 2 is formed of the periodic structure configured to convert the incident radio wave (a plane wave) into a Bloch wave.

Figure 14:
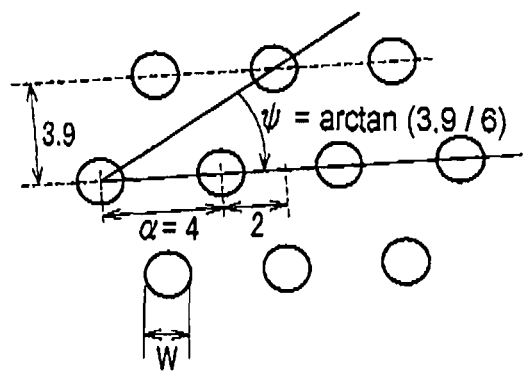
FIG. 14 is a view for explaining a traveling direction of a radio wave via the scatterer used in the radio communication system according to the third embodiment of the present invention.

To be more specific, as shown in FIG. 14, the radio communication system according to the present embodiment is configured to convert the radio wave incident on the EBG structure from the plane wave into the Bloch wave by diffracting the radio wave in the periodic structure, and to radiate the radio wave secondarily only in a direction determined by the periodic structure, the periodic structure formed by defining a width of individual pieces as "w" and defining an interval between any two of the individual pieces as "α".

For example, as shown in FIG. 14, inclining the array of the individual pieces in the EBG structure so as to be set to arctan (3.9/6) allows the radio wave incident on the EBG structure to be secondarily radiated in a direction inclined by an angle of 33 degrees.

Figure 15:
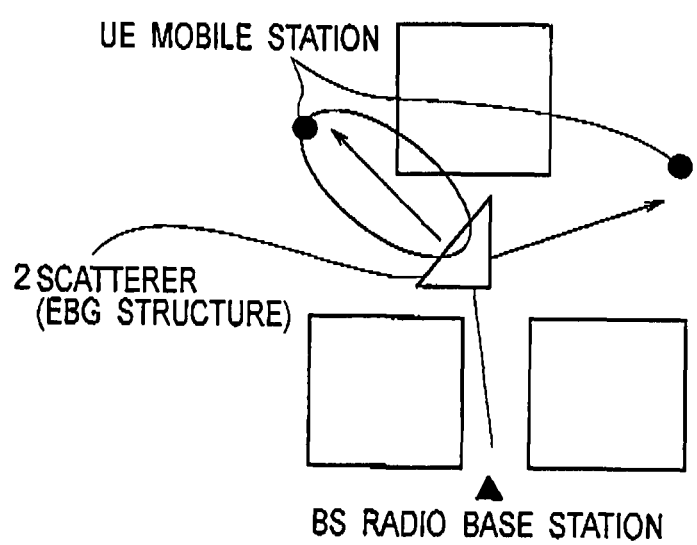
FIG. 15 is an overall configuration diagram of the radio communication system according to the third embodiment of the present invention.

As shown in FIG. 15, the radio communication system of the present embodiment converts the radio wave (the plane wave) radiated primarily by the transmission side apparatus into the Bloch wave and concentrates the propagation directions of the radio waves in a desired direction (direction of secondary radiation) by the super prism effect attributable to the EBG structure. Accordingly, the radio communication system of the present embodiment is able to increase the electric field intensity in the shadow region 3 (the desired area).

(Radio Communication System According to Fourth Embodiment of the Present Invention)

In a radio communication system according to a fourth embodiment of the present invention, the scatterer 2 is made of a metamaterial having a structure which transmits only radio waves in one or multiple predetermined frequency bands.

Figure 8:
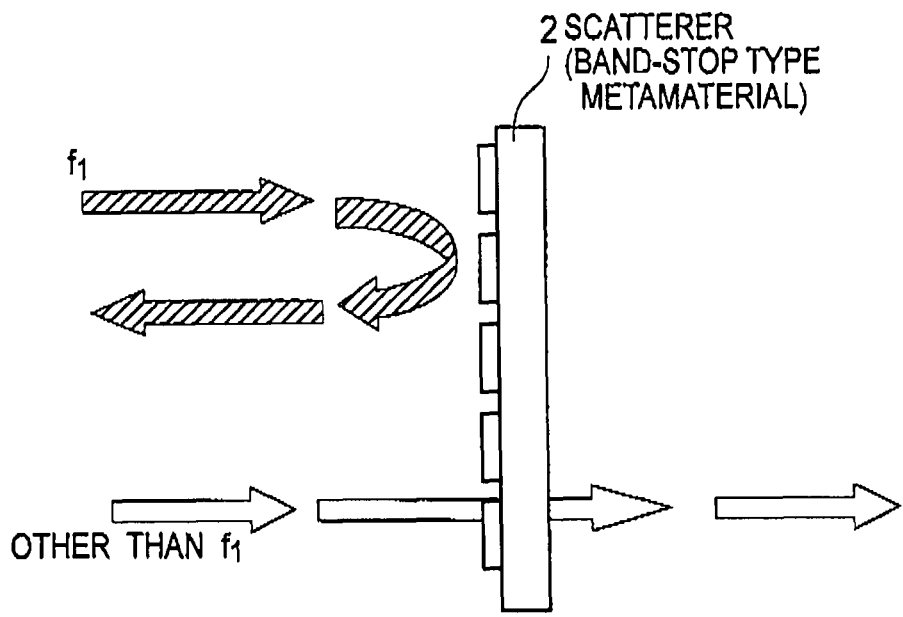
FIG. 8 is a view for explaining a scatterer used in a radio communication system according to a fourth embodiment of the present invention.

To be more specific, as shown in FIG. 8, in the radio communication system according to the present embodiment, the scatterer 2 is configured to reflect only a radio wave in a desired frequency band f1 and to transmit radio waves in other frequency bands.

In the radio communication system according to the present embodiment, the scatterer 2 is made of a metamaterial of a frequency band blocking type, for example. Here, such a metamaterial can be implemented by various methods including rod and ring periodic structures, and the like.

Figure 9:
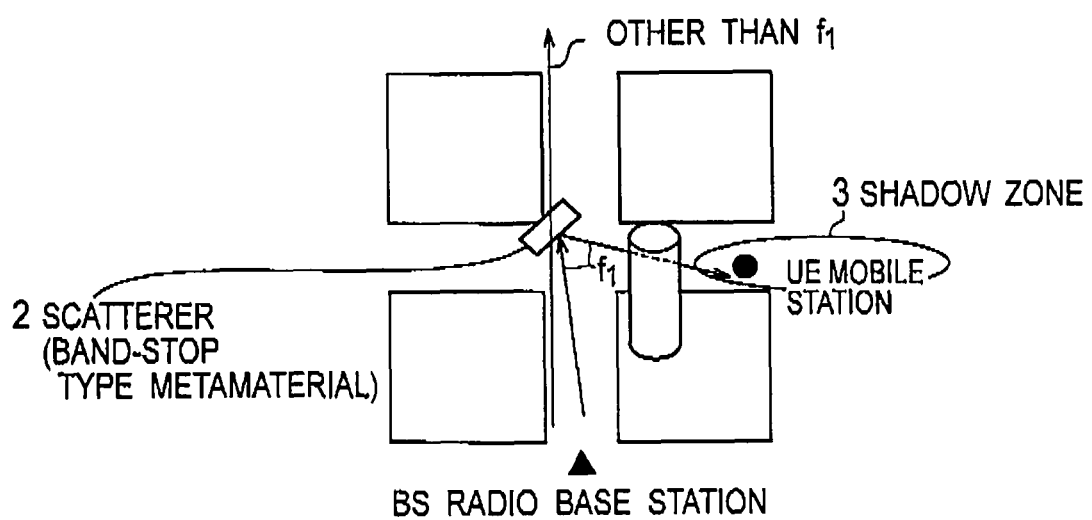
FIG. 9 is an overall configuration diagram of the radio communication system according to the fourth embodiment of the present invention.

As shown in FIG. 9, according to the radio communication system using the above-described scatterer 2, the scatterer 2 reflects the radio wave in the desired frequency band f1 in the direction other than the reflection angle direction of specular reflection to thereby cause the radio wave to reach the shadow region 3 where a direct wave from the radio base station ES is not reachable.

Moreover, as shown in FIG. 9, according to the radio communication system using the scatterer 2, the scatterer 2 transmits (refracts) the radio waves in the frequency bands other than the desired frequency band f1. Hence the radio communication system using the scatterer 2 is possible to prevent a trouble of affecting another system employing a different frequency band or interfering in the desired area unnecessarily.

(Radio Communication System According to Fifth Embodiment of the Present Invention)

In a radio communication system according to a fifth embodiment of the present invention, the scatterer 2 is made of a metamaterial having a structure which allows only radio waves in one or multiple predetermined frequency bands to be secondarily radiated.

Figure 10:
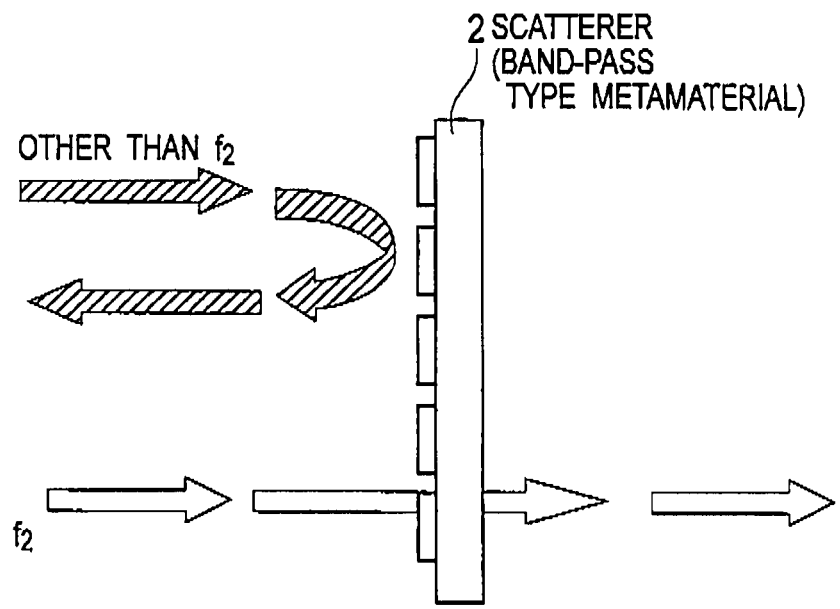
FIG. 10 is a view for explaining a scatterer used in a radio communication system according to a fifth embodiment of the present invention.

To be more specific, as shown in FIG. 10, in the radio communication system according to the present embodiment, the scatterer 2 is configured to transmit only a radio wave in a desired frequency band f2 and to reflect radio waves in other frequency bands.

For example, in the radio communication system according to the present embodiment, the scatterer 2 is made of a metamaterial of a frequency band transmitting type.

Figure 11:
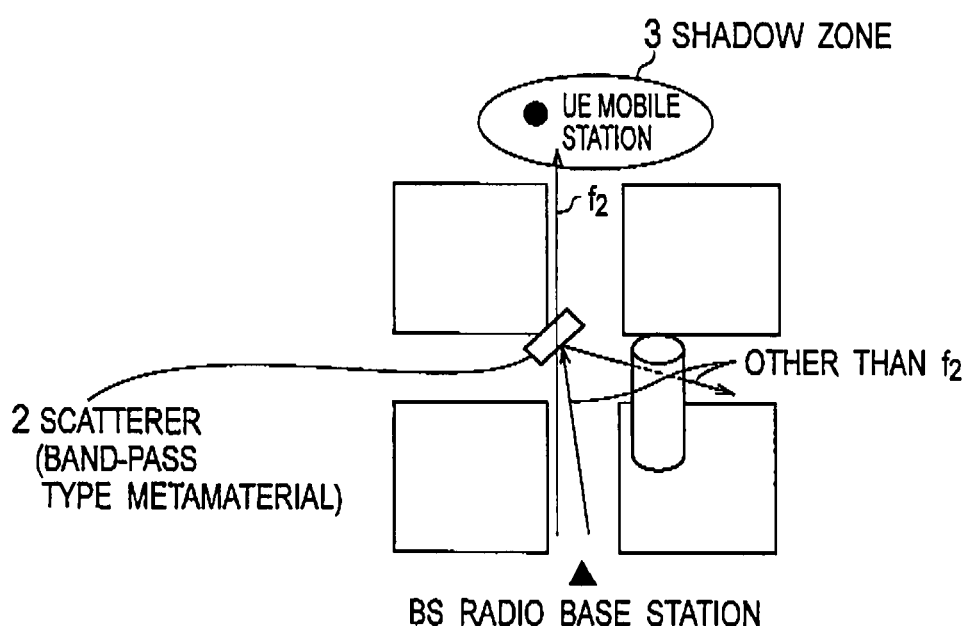
FIG. 11 is an overall configuration diagram of the radio communication system according to the fifth embodiment of the present invention.

As shown in FIG. 11, according to the radio communication system using the above-described scatterer 2, the scatterer 2 transmits (refracts) the radio wave in the desired frequency band f2 so as to cause the radio wave to reach the shadow region 3 where the direct wave from the radio base station BS is not reachable.

Moreover, as shown in FIG. 11, according to the radio communication system using the scatterer 2, the scatterer 2 reflects the radio waves in the frequency bands other than the desired frequency band f2. Hence the radio communication system using the scatterer 2 is possible to prevent a trouble of affecting another system employing a different frequency band or interfering in the desired area unnecessarily.

(Radio Communication System According to Sixth Embodiment of the Present Invention)

In a radio communication system according to a sixth embodiment of the present invention, the scatterer 2 is made of a metamaterial which operates in a first frequency band and in a second frequency band.

For example, the scatterer 2 is formed of the EBG structure allowing the use of multiple frequency bands or formed of an FSS (Frequency Selective Surface) structure.

Figure 12:
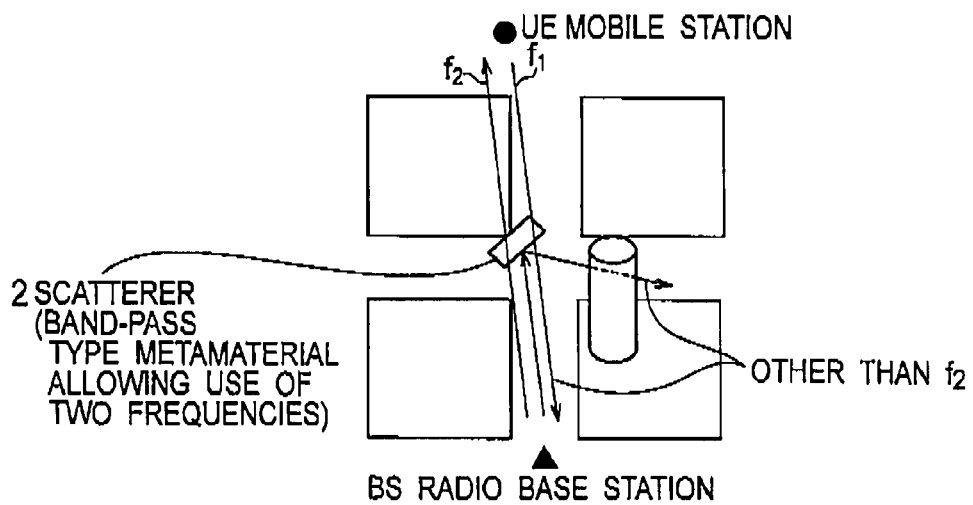
FIG. 12 is an overall configuration diagram of a radio communication system according to a sixth embodiment of the present invention.

For example, as shown in FIG. 12, the scatterer 2 having a frequency band transmitting type EBG structure, which allows the use of two frequencies, is configured to transmit (refract) a radio wave that is radiated primarily from the radio base station BS in a first frequency band f2 to radiate the radio wave secondarily to a mobile station UE located in the shadow region 3 (desired area). The scatterer 2 is also configured to transmit (refract) a radio wave that is radiated primarily from the mobile station UE in a second frequency band f1 to radiate the radio wave secondarily to the radio base station BS.

Here, the scatterer 2 is configured to reflect radio waves which are radiated primarily from the radio base station BS in frequency bands other than the first frequency band f2.

According to the radio communication system of the present embodiment, only a single scatterer 2 allows the improvement in communication quality of the shadow region 3 even when uplink communication and downlink communication employ different frequency bands.

(Radio Communication System According to Seventh Embodiment of the Present Invention)

In a radio communication system according to a seventh embodiment of the present invention, the scatterer 2 is formed by disposing a metal reflector on a back surface of a metamaterial.

Figure 16:
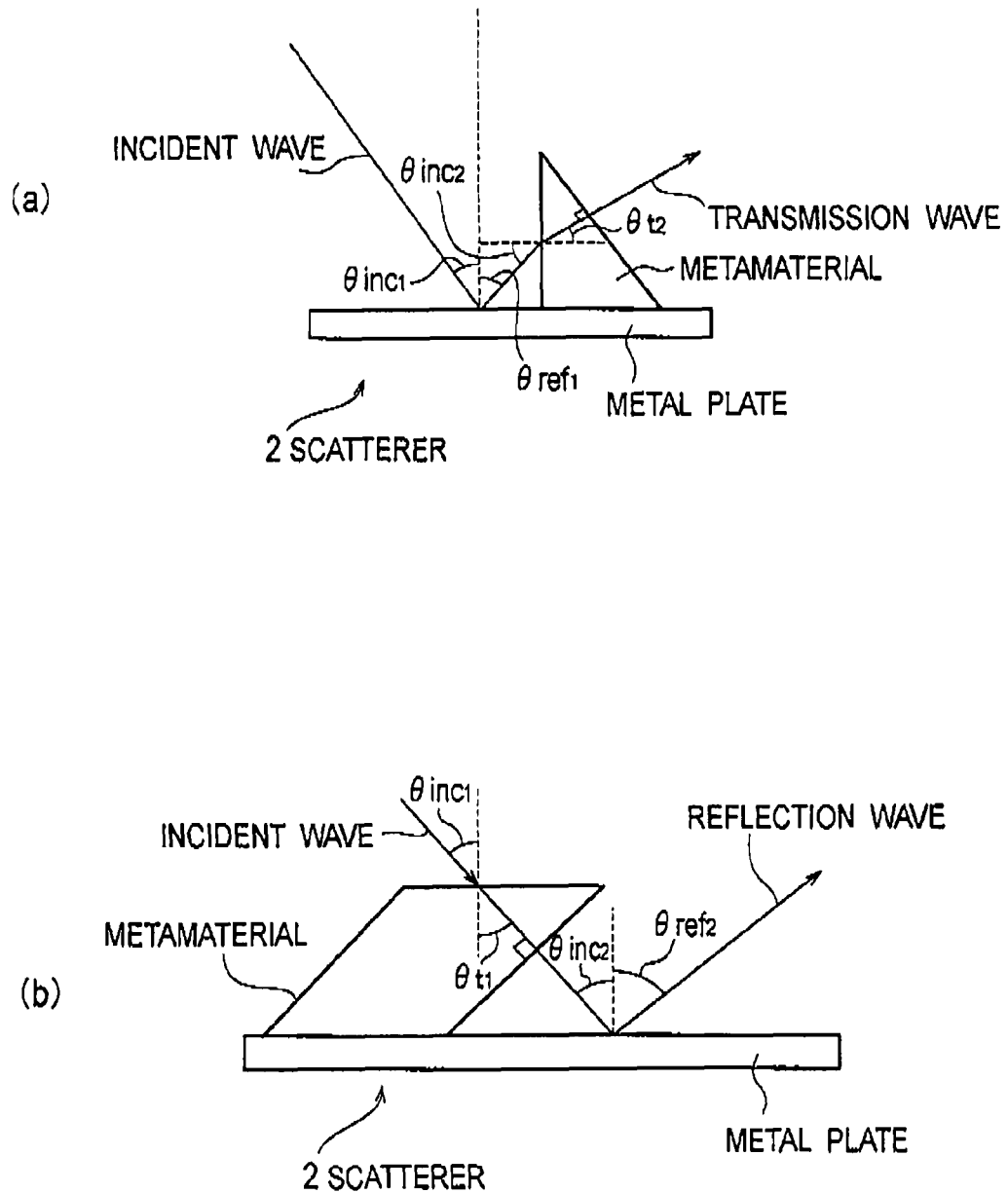
FIG. 16 is a view for explaining a scatterer used in a radio communication system according to a seventh embodiment of the present invention.

For example, as shown in FIG. 16($a$), the scatterer 2 may be configured to reflect the radio wave, which has reached the metal reflector without passing through the metamaterial, off the metal reflector, then to secondarily radiate the radio wave by causing the radio wave to pass through the metamaterial.

Meanwhile, as shown in FIG. 16($b$), the scatterer 2 may be configured to allow the radio rave made incident on the scatterer 2 to reach the metal reflector by causing the radio wave to pass through the metamaterial, to reflect the radio wave off the metal reflector, and to secondarily radiate the radio wave without causing the radio wave to pass through the metamaterial.

According to the radio communication system of this embodiment, the use of the metal reflector allows the increase in the electric field intensity of the radio wave to be radiated secondarily and a flexible change in direction in which the radio wave is to be secondarily radiated. Therefore, it is possible to allow the radio wave to reach the range to which the conventional reflector fails to radiate the radio wave secondarily.

(Radio Communication System According to Eighth Embodiment of the Present Invention)

In a radio communication system according to an eighth embodiment of the present invention, a metamaterial has a structure in which an evanescent wave inside the metamaterial is amplified by setting an electric constant of at least any one of the permittivity and the magnetic permeability to a negative value and setting a propagation constant (a wave vector k) to a negative value.

Specifically, in the radio communication system according to the present embodiment, the scatterer 2 has a structure in which the electric field intensity of the radio wave radiated secondarily from the scatterer 2 is increased due to an amplification effect of the evanescent wave.

Here, it has heretofore been considered that the evanescent wave was not applicable to the above-described scatterer because the electric field intensity was exponentially attenuated as the evanescent wave transmits inside a medium having a positive propagation constant.

On the other hand, inside a medium having a negative propagation constant, the electric field intensity of the evanescent wave is amplified as the evanescent transmits. Such a phenomenon is called a "super lens effect".

For this reason, in the radio communication system according to the present embodiment, in consideration of the "super lens effect", the scatterer 2 employs the structure which allows the evanescent wave to be amplified inside the metamaterial.

MODIFIED EXAMPLES

It is to be noted that the above-described scatterer 2 may have a structure in which the surface on which the radio wave is made incident is not parallel to the surface from which the radio wave is secondarily radiated, or may be configured by a frequency selective surface having the FSS structure.

Meanwhile, the above-described scatterer 2 may employ as the metamaterial a material (an artificial dielectric body or an artificial magnetic body), of which at least one of the permittivity $\in$ and the magnetic permeability μ is negative.

Here, the artificial dielectric body having the negative permittivity $\in$ can be implemented by an array of rods having the periodic structure. Meanwhile, the artificial magnetic body having the negative magnetic permeability μ can be implemented by a resonant ring having the periodic structure.

Further, a material (a left-handed material) having the permittivity $\in$ and the magnetic permeability μ which are both negative may be implemented by a combination of the array of rods having the periodic structure and the resonant ring having the periodic structure.

The use of the above-described scatterer 2 also allows the frequency selection, the negative refractive index (refraction in a third quadrant direction), or the improvement in the electric field intensity by the super prism effect.

Note that the above-described scatterer 2 may be made of a metamaterial having the EBG structure or a metamaterial not having the EBG structure.

Meanwhile, the scatterer 2 may be made of a reflector configured to control a phase of a reflected wave of the radio wave radiated primarily from the transmission side apparatus and a reflection characteristic of the reflector may be set in a way that the radio wave radiated primarily from the transmission side apparatus is reflected as an equiphase plane wave which is to be directed to a different direction from the reflection angle of specular reflection.

Furthermore, the reflector may be formed made of a frequency selective reflector and a reflection characteristic thereof may be set in a way that only radio waves in a single or multiple frequency bands among the radio waves radiated primarily from the transmission side apparatus is reflected as the equiphase plane wave which is to be directed to a different direction from the reflection angle of specular reflection.

For example, the scatterer 2 may be formed of a reflect array made of a metamaterial. Here, elements arrayed so as to align phase differences of reflection coefficients with a specific direction will be collectively referred to as the "reflect array".

As has been described so far, the present invention has been described in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2008-224182 (filed on Sep. 1, 2008) is incorporated herein by reference.

Industrial Applicability

According to the present invention, it is possible to provide a radio communication system which employs a scatterer configured so that a radio wave radiated primarily from a transmission side apparatus is radiated secondarily by the scatterer in directions other than a direction at a reflection angle of specular reflection.

The invention claimed is:

1. A radio communication system comprising:
a scatterer configured to reflect, refract, or transmit a radio wave radiated primarily from a transmission side apparatus to radiate the radio wave secondarily to a desired area, wherein
a metamaterial is used for the scatterer, and
a metal reflector for controlling the scatterer, a reflected wave and a transmitted wave is disposed on a back surface of the metamaterial, wherein
the system is configured so that a radio wave having passed through the metamaterial reaches the metal reflector, and the radio wave having reflected off the metal reflector is radiated secondarily without passing through the metamaterial.

2. The radio communication system according to claim 1, wherein the scatterer has a structure which allows the radio wave to be radiated secondarily in a direction at an angle different from a reflection angle of specular reflection.

3. The radio communication system according to claim 1, wherein the scatterer has a structure which allows only radio waves in one or a plurality of predetermined frequency bands to be radiated secondarily.

4. The radio communication system according to claim 1, wherein the scatterer has a structure which allows the radio waves made incident to be concentrated in a direction of propagation.

5. The radio communication system according to claim 4, wherein the metamaterial has a structure in which an evanescent wave is amplified inside the metamaterial by setting an electric constant of at least any one of a permittivity and a magnetic permeability of the metamaterial to a negative value and setting a propagation constant of the metamaterial to a negative value.

6. The radio communication system according to claim 4, wherein the metamaterial is formed of a periodic structure in which the radio wave made incident on the scatterer is converted into a Bloch wave.

7. The radio communication system according to claim 1, wherein the scatterer is formed of an Electromagnetic Band Gap (EBG) structure.

8. The radio communication system according to claim 7, wherein the EBG structure is formed of a periodic structure in which the radio wave made incident on the scatterer is converted into a Bloch wave.

9. The radio communication system according to claim 1, wherein the transmission side apparatus is any of a radio base station and a mobile station.

10. The radio communication system according to claim 1, wherein the system is configured so that
a radio wave having reached the metal reflector without passing through the metamaterial is reflected off the metal reflector, and thereafter passes through the metamaterial to be reflected secondarily.

11. The radio communication system according to claim 1, wherein the metamaterial is configured to operate in a first frequency band and a second frequency band, and
the metamaterial is configured to radiate, secondarily to the mobile station, a radio wave having been radiated primarily from the radio base station in the first frequency band and to radiate, secondarily to the base station, a radio wave having been radiated primarily from the mobile station in the second frequency band.

12. The radio communication system according to claim 1, wherein the scatterer is formed of a reflector that controls a phase of a reflected wave of a radio wave radiated primarily from the transmission side apparatus, and
a reflection characteristic of the reflector is set in a way that the radio wave radiated primarily from the transmission side apparatus is reflected as an equiphase plane wave to be directed to a different direction from a reflection angle of specular reflection.

13. The radio communication system according to claim 12,
wherein the reflector is formed of a frequency selective reflector, and
a reflection characteristic of the reflector is set in a way that only radio waves in one or a plurality of predetermined frequency bands among radio waves radiated primarily from the transmission side apparatus are reflected as equiphase plane waves to be directed to a different direction from a reflection angle of specular reflection.

14. A radio communication system comprising:
a scatterer configured to reflect, refract, or transmit a radio wave radiated primarily from a transmission side apparatus to radiate the radio wave secondarily to a desired area, wherein
a metamaterial is used for the scatterer, and
a metal reflector for controlling the scatterer, a reflected wave and a transmitted wave is disposed on a back surface of the metamaterial, wherein
the metamaterial is formed into a shape of a polyhedron,
the system being configured so that a radio wave made incident on the metamaterial at a first incident angle is refracted in a direction at a second refraction angle by a first boundary surface, and so that a second boundary surface through which the refracted radio wave is radiated from an inside of the metamaterial to air is formed non-parallel to the first incident angle.

* * * * *